No. 765,914. PATENTED JULY 26, 1904.
W. S. BOYD, 3D.
SPECTACLE OR EYEGLASS SUPPORT.
APPLICATION FILED JUNE 15, 1903.
NO MODEL.
Fig. I
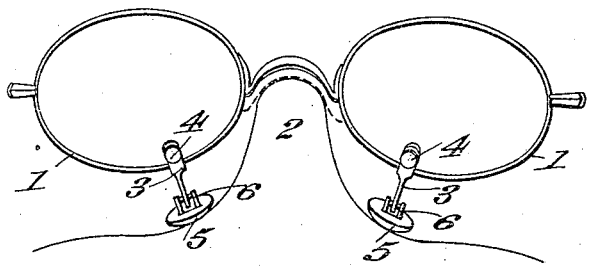
Fig. II
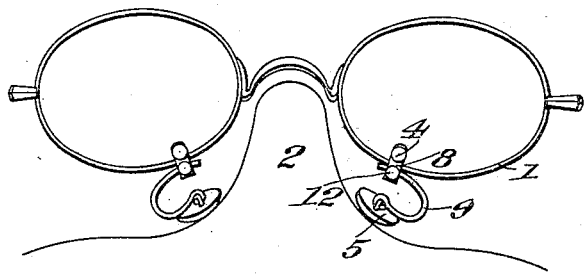
Fig. III
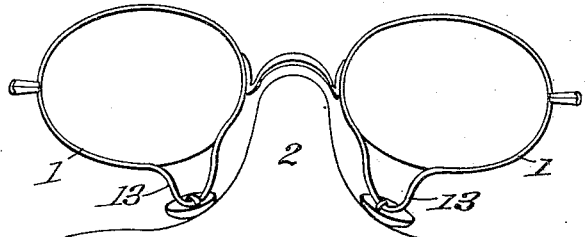
Fig. IV
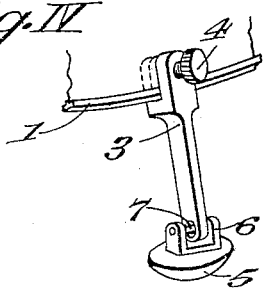
Fig. V
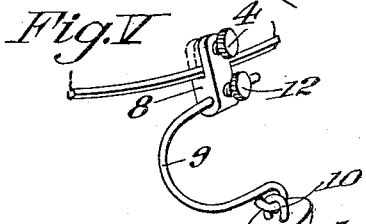
Witnesses
Geo. L. Goetz
G. T. Hackley
Inventor
William S. Boyd 3d
by Townsend Bros.
his attys.

No. 765,914. Patented July 26, 1904.

UNITED STATES PATENT OFFICE.

WILLIAM S. BOYD, 3d, OF LOS ANGELES, CALIFORNIA.

SPECTACLE OR EYEGLASS SUPPORT.

SPECIFICATION forming part of Letters Patent No. 765,914, dated July 26, 1904.

Application filed June 15, 1903. Serial No. 161,554. (No model.)

*To all whom it may concern:*

Be it known that I, WILLIAM S. BOYD, 3d, a citizen of the United States, residing at Los Angeles, in the county of Los Angeles and State of California, have invented a new and useful Spectacle or Eyeglass Support, of which the following is a specification.

This invention relates to a device which is adapted to be attached to spectacles or eyeglasses of any construction; and it consists of a prop or support adjustably or fixedly attached to the frame or glass, or both frame and glass, of spectacles or eyeglasses and which may rest on the nose or any part of the face in such a manner as to almost or entirely relieve the weight of the spectacles or eyeglasses on the top of the nose.

Spectacles or eyeglasses as now constructed, particularly spectacles, cause an annoying pressure on the top of the nose, due to the weight of the glasses and frame. The pressure produced by the weight causes ridges to be formed on the top of the nose, and the chafing and weight frequently cause the skin to become irritated or disfigured, or both. By the use of the device forming the present invention this is obviated by a construction which is extremely simple, efficient, and durable and which may be economically manufactured.

The accompanying drawings illustrate the invention, and, referring to the same, Figure I is a plan view of a pair of spectacles with the prop or support attached thereto, with a cross-profile of the face to illustrate positions which the parts bear with respect to the face, the profile being on the line where the projected plane of the glasses touches the face, the plane being oblique with respect to the vertical axis of the head. Fig. II is a view similar to Fig. I, showing another form of prop or support. Fig. III is a view similar to Fig. II, showing another form of support. Fig. IV is a detail of the preferred construction of the prop or support. Fig. V is a detail of the form of prop or support shown in Fig. II.

1 designates the frame of the spectacles.
2 designates the nose of the face.
3 is a clip, which may be attached to the glass alone, to the frame alone, or to both, and which may comprise a bifurcated member through one fork of which a screw 4 passes, which may clamp against either the glass or frame, or both, to hold the same in position. To the lower end of the clip may flexibly be attached a cushion which is adapted to rest against any part of the face, but is preferably formed to rest against the base of the nose.

5 designates the cushion, which may be of any desired material and may preferably have a convex bearing-face. Projecting upwardly from the cushion is a slotted lug 6, which receives the lower end of the clip 3. A pin 7 passes through the slotted lug 6 and through a hole in the lower end of the clip 3, and thus flexibly attaches the cushion to the clip. The pin 7 should be smaller than the hole in the clip, and the slot in the lug 6 should be wider than the thickness of the lower part of the clip, so as to allow the cushion 5 to assume different positions in order that it may adapt itself to the contour of that part of the face against which it bears. The cushion and clip form what is termed the "prop" or "support."

By loosening the screw 4 the clip may be adjusted to any position on the spectacle or eyeglass, and after the position has been secured which gives the best fit of the cushion against the part of the face the screw 4 may again be tightened to clamp the clip in position. If desired, the clip could be fixedly secured to the spectacles or eyeglass by riveting or soldering the same thereto. The rivet might be passed through the glass or through a loop formed in the frame. The clip might also be made of a spring material.

Fig. II shows another form of prop comprising a clip 8, which may be attached to the spectacles or eyeglass in a manner similar to the clip 3 and which may be connected to the cushion 5 by a wire 9. The wire 9 may be attached to the cushion 5 by passing through a perforated lug 10, carried by the cushion. The wire 9 may be looped, as shown, being desirably curved into a substantial U shape, and may be attached to the clip 8 by passing through a perforation in the clip, a screw 12 serving to clamp the same in the clip. In use the cushion bears against opposite sides of the base of the nose and the props support the weight of the spectacles or eyeglasses and keep the bridge of the frame a slight distance away from the top of the nose, so that there is no contact between the top of the nose and the bridge of the spectacles or eyeglass. Thus there is no chance of chafing or of any disfiguring of the nose. In Fig. I the dotted lines indicate how the bridge of the spectacles would rest against the top of the nose when the spectacles are not provided with the props or supports.

Fig. III shows another form of prop or support in which the lower wire of each bow is bent to form a prop or support 13, which may have cushions similar to those previously described.

The device and attachment as shown I deem best to accomplish my purpose; but I claim the right to attach the parts in any manner desirable which would fall within the scope of the claims.

One of the most important features of my invention is that the props are so constructed that they may be attached to spectacles or eyeglasses by any one in a moment. No fitting or reconstruction of the glasses is necessary. The clips 3 may be slipped into the frame at the desired points and the screws 4 tightened to hold the same in position. So far as I am aware I am the first to provide a spectacle or eyeglass support which may be manufactured independently of the glasses and complete in itself ready for instant application by any one to the glasses.

What I claim is—

1. In a device of the character described, a prop comprising a clip detachably attached to the lower part of the rim of the spectacles or eyeglass for supporting the same by relieving the weight on the top of the nose, and a cushion connected to the clip for resting against the base of the nose.

2. In a device of the class described, a clip adapted to be attached to the spectacles and provided with a perforation, a U-shaped wire, one end of which is adapted to pass through said perforation, means for adjustably securing one end of said wire in said perforation, and a pad movably attached to the other end of said wire.

3. In a device of the character described, means for relieving the weight of the spectacles or eyeglass on the top of the nose comprising cushions adapted to rest against the base of the nose, clips adjustably attached to the spectacles or eyeglass, said cushions being loosely connected to said clips.

4. In a device of the class described, a clip adapted to be attached to the spectacles and provided with a perforation, a U-shaped wire, one end of which is adapted to pass through said perforation, a set-screw for adjustably securing one end of said wire in said perforation, and a pad movably attached to the other end of said wire.

5. In a device of the character described, a prop for relieving the weight of the spectacles or eyeglass on the top of the nose comprising a bifurcated clip, a screw carried by the clip for clamping the same on the spectacles or eyeglass and a cushion flexibly connected to the bottom of the clip.

6. In a device of the character described, in combination with the spectacles, props for relieving the weight of the spectacles on the top of the nose comprising a pair of clips attached respectively to the lower part of the right and left lens or rim, and a cushion adjustably connected to each clip.

7. In a device of the character described, in combination with the spectacles, props relieving the weight of the spectacles on the top of the nose comprising a pair of clips attached respectively to the lower part of the right and left lens or rim, each clip being perforated, a curved wire passing through the perforation in each clip for clamping the wire, and a pad carried by each wire.

8. In a device of the character described, in combination with the spectacles, props for relieving the weight of the spectacles on the top of the nose comprising a pair of clips attached respectively to the lower part of the right and left lens or rim, each clip being perforated, a curved wire passing through the perforation in each clip for clamping the wire, and a pad connected by a universal joint with each curved wire.

In testimony whereof I have signed my name to this specification, in the presence of two subscribing witnesses, at Los Angeles, in the county of Los Angeles and State of California, this 9th day of June, 1903.

WILLIAM S. BOYD, 3D.

Witnesses:
GEORGE T. HACKLEY,
JULIA TOWNSEND.